US012565578B2

(12) United States Patent
Kahlen et al.

(10) Patent No.: US 12,565,578 B2
(45) Date of Patent: Mar. 3, 2026

(54) POLYPROPYLENE-POLYETHYLENE BLENDS WITH IMPROVED PROPERTIES

(71) Applicant: Borealis AG, Vienna (AT)

(72) Inventors: Susanne Margarete Kahlen, Linz (AT); Hermann Braun, Linz (AT); Yi Liu, Linz (AT); Meta Cigon, Vienna (AT); Philip Knapen, Beringen (BE)

(73) Assignee: Borealis AG, Vienna (AT)

( * ) Notice: Subject to any disclaimer, the term of this patent is extended or adjusted under 35 U.S.C. 154(b) by 933 days.

(21) Appl. No.: 17/635,838

(22) PCT Filed: Aug. 4, 2020

(86) PCT No.: PCT/EP2020/071844

§ 371 (c)(1),
(2) Date: Feb. 16, 2022

(87) PCT Pub. No.: WO2021/032459

PCT Pub. Date: Feb. 25, 2021

(65) Prior Publication Data

US 2022/0306844 A1     Sep. 29, 2022

(30) Foreign Application Priority Data

Aug. 19, 2019    (EP) .................................... 19192203

(51) Int. Cl.
| | |
|---|---|
| *C08L 23/14* | (2006.01) |
| *C08L 23/06* | (2006.01) |
| *C08L 23/12* | (2006.01) |
| *C08L 23/16* | (2006.01) |

(52) U.S. Cl.
CPC .............. *C08L 23/06* (2013.01); *C08L 23/12* (2013.01); *C08L 2205/025* (2013.01); *C08L 2205/03* (2013.01); *C08L 2207/20* (2013.01)

(58) Field of Classification Search
None
See application file for complete search history.

(56) References Cited

U.S. PATENT DOCUMENTS

| | | | |
|---|---|---|---|
| 5,767,230 A | 6/1998 | Scarola et al. |
| 9,637,602 B2 | 5/2017 | Potter et al. |
| 9,670,293 B2 | 6/2017 | Reznichenko et al. |
| 9,670,347 B2 | 6/2017 | Tölsch et al. |
| 9,695,261 B2 | 7/2017 | Boragno et al. |
| 9,708,481 B2 | 7/2017 | Wang et al. |
| 9,745,431 B2 | 8/2017 | Potter et al. |
| 9,751,962 B2 | 9/2017 | Wang et al. |
| 9,777,142 B2 | 10/2017 | Sandholzer et al. |
| 9,802,394 B2 | 10/2017 | Cavacas et al. |
| 9,828,698 B2 | 11/2017 | Wang et al. |
| 9,890,275 B2 | 2/2018 | Sandholzer et al. |
| 9,976,020 B2 | 5/2018 | Nummila-Pakarinen et al. |
| 10,011,708 B2 | 7/2018 | Lampela et al. |
| 10,030,109 B2 | 7/2018 | Boragno et al. |
| 10,040,930 B2 | 8/2018 | Gloger et al. |
| 10,100,185 B2 | 10/2018 | Wang et al. |
| 10,100,186 B2 | 10/2018 | Wang et al. |
| 10,227,427 B2 | 3/2019 | Reichelt et al. |
| 10,450,451 B2 | 10/2019 | Wang et al. |
| 10,519,259 B2 | 12/2019 | Resconi et al. |
| 10,870,718 B2 | 12/2020 | Denifl et al. |
| 11,292,900 B2 | 4/2022 | Gahleitner et al. |
| 11,299,617 B2 | 4/2022 | Prieto et al. |
| 11,390,732 B2 | 7/2022 | Van Houcke et al. |
| 11,492,478 B2 | 11/2022 | Kniesel et al. |
| 11,504,949 B2 | 11/2022 | Oderkerk et al. |
| 11,518,863 B2 | 12/2022 | Vijay |
| 11,530,321 B2 | 12/2022 | Kniesel et al. |
| 11,827,758 B2 | 11/2023 | Jerabek et al. |
| 11,827,777 B2 | 11/2023 | Wang et al. |
| 11,834,529 B2 | 12/2023 | Wang et al. |
| 11,851,552 B2 | 12/2023 | Gloger et al. |
| 11,912,849 B2 | 2/2024 | Jerabek et al. |
| 11,945,926 B2 | 4/2024 | Kahle et al. |

(Continued)

FOREIGN PATENT DOCUMENTS

| | | |
|---|---|---|
| CN | 105143286 A | 12/2015 |
| CN | 108025826 A | 5/2018 |

(Continued)

OTHER PUBLICATIONS

U.S. Appl. No. 14/914,501, filed Feb. 25, 2016.
U.S. Appl. No. 14/911,295, filed Feb. 10, 2016.
U.S. Appl. No. 14/911,300, filed Feb. 10, 2016.
U.S. Appl. No. 14/911,299, filed Feb. 10, 2016.
U.S. Appl. No. 15/022,671, filed Mar. 17, 2016.
U.S. Appl. No. 15/030,556, filed Apr. 19, 2016.
U.S. Appl. No. 15/022,664, filed Mar. 17, 2016.
U.S. Appl. No. 15/029,493, filed Apr. 14, 2016.
U.S. Appl. No. 15/027,129, filed Apr. 4, 2016.
U.S. Appl. No. 15/101,837, filed Jun. 3, 2016.
U.S. Appl. No. 15/106,101, filed Jun. 17, 2016.
U.S. Appl. No. 15/103,783, filed Jun. 10, 2016.

(Continued)

*Primary Examiner* — Michael J Feely
(74) *Attorney, Agent, or Firm* — Leydig, Voit & Mayer, Ltd.

(57) ABSTRACT

Disclosed is a polymer composition comprising at least the following components A) 20 to 75 wt.-% based on the overall weight of the polymer composition of a polymer blend, comprising a1) polypropylene; a2) polyethylene; wherein the weight ratio of a1) to a2) is from 3:7 to 12:1; and wherein the polymer blend A) is a recycled material; B) 25 to 80 wt.-% based on the overall weight of the polymer composition of a virgin random polypropylene copolymer wherein the weight proportions of components A) and B) add up to 100 wt.-%. Also disclosed are a process for manufacturing the polymer composition to the use of component B) for improving mechanical properties of polymer blends A) and to articles comprising the polymer composition.

13 Claims, No Drawings

(56) References Cited

U.S. PATENT DOCUMENTS

| | | | |
|---|---|---|---|
| 11,981,781 | B2 | 5/2024 | Prieto et al. |
| 12,006,426 | B2 | 6/2024 | Wang et al. |
| 12,043,687 | B2 | 7/2024 | Krallis et al. |
| 12,049,552 | B2 | 7/2024 | Kulshreshtha et al. |
| 2002/0128394 | A1 | 9/2002 | Gorski et al. |
| 2016/0060371 | A1 | 3/2016 | Boragno et al. |
| 2016/0185946 | A1 | 6/2016 | Sandholzer et al. |
| 2016/0194486 | A1 | 7/2016 | Sandholzer et al. |
| 2016/0200838 | A1 | 7/2016 | Reznichenko et al. |
| 2016/0208085 | A1 | 7/2016 | Gloger et al. |
| 2016/0229158 | A1 | 8/2016 | Cavacas et al. |
| 2016/0237270 | A1 | 8/2016 | Wang et al. |
| 2016/0244539 | A1 | 8/2016 | Resconi et al. |
| 2016/0272740 | A1 | 9/2016 | Wang et al. |
| 2016/0280899 | A1 | 9/2016 | Töltsch et al. |
| 2016/0304681 | A1 | 10/2016 | Potter et al. |
| 2016/0311951 | A1 | 10/2016 | Reichelt et al. |
| 2016/0311988 | A1 | 10/2016 | Potter et al. |
| 2016/0312018 | A1 | 10/2016 | Vestberg et al. |
| 2016/0312019 | A1 | 10/2016 | Lampela et al. |
| 2016/0347943 | A1 | 12/2016 | Wang et al. |
| 2016/0347944 | A1 | 12/2016 | Wang et al. |
| 2017/0009068 | A1 | 1/2017 | Kahlen et al. |
| 2017/0029980 | A1 | 2/2017 | Wang et al. |
| 2017/0137617 | A1 | 5/2017 | Wang et al. |
| 2017/0166711 | A1 | 6/2017 | Boragno et al. |
| 2017/0218172 | A1 | 8/2017 | Wang et al. |
| 2017/0313867 | A1 | 11/2017 | Lampela et al. |
| 2017/0321048 | A1 | 11/2017 | Nummila-Pakarinen et al. |
| 2018/0079875 | A1 | 3/2018 | Braun et al. |
| 2018/0194881 | A1 | 7/2018 | Denifl et al. |
| 2020/0263015 | A1 | 8/2020 | Kniesel et al. |
| 2020/0270434 | A1 | 8/2020 | Van Houcke et al. |
| 2020/0277479 | A1 | 9/2020 | Jerabek et al. |
| 2020/0308353 | A1 | 10/2020 | Jerabek et al. |
| 2020/0308385 | A1 | 10/2020 | Gahleitner et al. |
| 2020/0347216 | A1 | 11/2020 | Kniesel et al. |
| 2020/0392321 | A1 | 12/2020 | Gahleitner et al. |
| 2021/0114352 | A1 | 4/2021 | Oderkerk et al. |
| 2021/0171749 | A1 | 6/2021 | Kumar et al. |
| 2021/0171750 | A1 | 6/2021 | Gahleitner et al. |
| 2021/0214527 | A1 | 7/2021 | Gahleitner et al. |
| 2021/0214533 | A1 | 7/2021 | Kulshreshtha et al. |
| 2021/0238376 | A1 | 8/2021 | Kahlen et al. |
| 2021/0253836 | A1 | 8/2021 | Gahleitner et al. |
| 2021/0269560 | A1 | 9/2021 | Krallis et al. |
| 2021/0324189 | A1 | 10/2021 | Prieto et al. |
| 2021/0332227 | A1 | 10/2021 | Wang et al. |
| 2021/0347971 | A1 | 11/2021 | Wang et al. |
| 2022/0033631 | A1 | 2/2022 | Gloger et al. |
| 2022/0135779 | A1 | 5/2022 | Wang et al. |
| 2022/0204719 | A1 | 6/2022 | Vijay |
| 2022/0227965 | A1 | 7/2022 | Ruemer et al. |
| 2022/0251256 | A1 | 8/2022 | Wang et al. |
| 2022/0289955 | A1 | 9/2022 | Kahlen et al. |
| 2022/0315716 | A1 | 10/2022 | Prieto et al. |
| 2022/0356330 | A1 | 11/2022 | Kahlen et al. |
| 2023/0046086 | A1 | 2/2023 | Al-Haj Ali et al. |
| 2023/0047329 | A1 | 2/2023 | Al-Haj Ali |
| 2023/0212338 | A1 | 7/2023 | Wang et al. |
| 2024/0043584 | A1 | 2/2024 | Wang et al. |

FOREIGN PATENT DOCUMENTS

| | | | | | |
|---|---|---|---|---|---|
| CN | 108148281 | A | 6/2018 | | |
| DE | 37 42 845 | A1 | 7/1989 | | |
| DE | 103 43 964 | A1 | 4/2005 | | |
| EP | 0 887 379 | A1 | 12/1998 | | |
| EP | 1 495 074 | A1 | 1/2005 | | |
| EP | 1 963 067 | A1 | 9/2008 | | |
| EP | 2 062 937 | A1 | 5/2009 | | |
| EP | 3 165 473 | A1 | 5/2017 | | |
| EP | 3412692 | A1 | * 12/2018 | ............. | B32B 27/08 |
| JP | 2009-520847 | A | 5/2009 | | |
| KR | 10-2018-0066257 | A | 6/2018 | | |

| | | | |
|---|---|---|---|
| WO | WO 92/12182 | A1 | 7/1992 |
| WO | WO 99/24478 | A1 | 5/1999 |
| WO | WO 99/24479 | A1 | 5/1999 |
| WO | WO 00/68315 | A1 | 11/2000 |
| WO | WO 03/087215 | A1 | 10/2003 |
| WO | WO 2004/000899 | A1 | 12/2003 |
| WO | WO 2004/111095 | A1 | 12/2004 |
| WO | WO 2007/071494 | A1 | 6/2007 |
| WO | WO 2012/007430 | A1 | 1/2012 |
| WO | WO 2013/025822 | A1 | 2/2013 |
| WO | WO 2014/167493 | A1 | 10/2014 |
| WO | WO 2014/187686 | A1 | 11/2014 |
| WO | WO 2014/187687 | A1 | 11/2014 |
| WO | WO 2015/169690 | A1 | 11/2015 |
| WO | WO 2017/076933 | A1 | 5/2017 |
| WO | WO 2018/206353 | A1 | 11/2018 |
| WO | WO 2019/038395 | A1 | 2/2019 |
| WO | WO 2019/091886 | A1 | 5/2019 |
| WO | WO 2019/224129 | A1 | 11/2019 |

OTHER PUBLICATIONS

U.S. Appl. No. 15/039,107, filed May 25, 2016.
U.S. Appl. No. 15/103,744, filed Jun. 10, 2016.
U.S. Appl. No. 15/102,628, filed Jun. 8, 2016.
U.S. Appl. No. 15/113,907, filed Jul. 25, 2016.
U.S. Appl. No. 15/113,922, filed Jul. 25, 2016.
U.S. Appl. No. 15/113,517, filed Jul. 22, 2016.
U.S. Appl. No. 15/115,929, filed Aug. 2, 2016.
U.S. Appl. No. 15/310,263, filed Nov. 10, 2016.
U.S. Appl. No. 15/514,641, filed Mar. 27, 2017.
U.S. Appl. No. 15/531,974, filed May 31, 2017.
U.S. Appl. No. 15/526,957, filed May 15, 2017.
U.S. Appl. No. 15/566,588, filed Oct. 13, 2017.
U.S. Appl. No. 15/741,861, filed Jan. 4, 2018.
U.S. Appl. No. 16/633,699, filed Jan. 24, 2020.
U.S. Appl. No. 16/761,743, filed May 5, 2020.
U.S. Appl. No. 16/761,757, filed May 5, 2020.
U.S. Appl. No. 16/652,115, filed Mar. 30, 2020.
U.S. Appl. No. 16/763,014, filed May 11, 2020.
U.S. Appl. No. 16/763,001, filed May 11, 2020.
U.S. Appl. No. 16/768,330, filed May 29, 2020.
U.S. Appl. No. 16/982,385, filed Sep. 18, 2020.
U.S. Appl. No. 17/050,550, filed Oct. 26, 2020.
U.S. Appl. No. 17/052,233, filed Nov. 2, 2020.
U.S. Appl. No. 17/047,350, filed Oct. 13, 2020.
U.S. Appl. No. 15/733,971, filed Dec. 1, 2020.
U.S. Appl. No. 16/973,673, filed Dec. 9, 2020.
U.S. Appl. No. 17/259,216, filed Jan. 11, 2021.
U.S. Appl. No. 17/273,687, filed Mar. 4, 2021.
U.S. Appl. No. 17/273,700, filed Mar. 4, 2021.
U.S. Appl. No. 17/273,711, filed Mar. 4, 2021.
U.S. Appl. No. 17/276,275, filed Mar. 15, 2021.
U.S. Appl. No. 17/276,322, filed Mar. 15, 2021.
U.S. Appl. No. 17/413,612, filed Jun. 14, 2021.
U.S. Appl. No. 17/622,891, filed Dec. 27, 2021.
U.S. Appl. No. 17/623,657, filed Dec. 29, 2021.
U.S. Appl. No. 17/624,609, filed Jan. 4, 2022.
U.S. Appl. No. 17/635,764, filed Feb. 16, 2022.
U.S. Appl. No. 17/635,892, filed Feb. 16, 2022.
The Patent Office of the People's Republic of China, First Notification of Office Action issued in Chinese Patent Application No. 202080058035.4 (Feb. 10, 2023).
United Arab Emirates International Center for Patent Registration Ministry of Economy, Office Action Summary (Examination Result) and search report in UAE Patent Application No. P6000280 / 2022 (Dec. 6, 2024).
*Propylene Handbook, 2nd Edition*, Chapter 5.3 "Random Copolymers," pp. 312-314, Nello Pasquini, Editor, Hanser (2005).
European Patent Office, Communication of a Notice of Opposition in European Patent Application No. 20753317.5 (Apr. 30, 2025).
European Patent Office, Grounds of Opposition in EP 4 017 917 B1 (Apr. 24, 2025).

(56)            References Cited

OTHER PUBLICATIONS

Intellectual Property India, First Examination Report in Indian Patent Application No. 202217014266 (Jul. 18, 2022).

The Patent Office of the People's Republic of China, Decision of Rejection in Chinese Patent Application No. 202080058035.4 (Mar. 12, 2024).

Korean Intellectual Property Office, Notice of Allowance in Korean Patent Application No. 10-2022-7008712 (Aug. 23, 2024).

U.S. Appl. No. 17/791,987, filed Jul. 11, 2022.

U.S. Appl. No. 17/792,003, filed Jul. 11, 2022.

Busico et al., "Alk-1-ene Polymerization in the Presence of a Monocyclopentadienyl Zirconium(IV) Acetamidinate Catalyst: Microstructural and Mechanistic Insights$^a$," *Macromol. Rapid Commun.* 28: 1128-1134 (2007).

Cheng, "$^{13}$C NMR Analysis of Ethylene-Propylene Rubbers," *Macromolecules* 17: 1950-1955 (1984).

Singh et al., "Triad sequence determination of ethylene-propylene copolymers—application of quantitative $^{13}$C NMR," *Polymer Testing* 28(5): 475-479 (2009).

Wang et al., "Structural Analysis of Ethylene/Propylene Copolymers Synthesized with a Constrained Geometry Catalyst," *Macromolecules* 33: 1157-1162 (2000).

Zhou et al., "A new decoupling method for accurate quantification of polyethylene copolymer composition and triad sequence distribution with $^{13}$C NMR," *J. Magnet. Reson.* 187: 225-233 (2007).

European Patent Office, Extended European Search Report in European Patent Application No. 19 19 2203 (Feb. 12, 2020).

European Patent Office, International Search Report in International Application No. PCT/EP2020/071844 (Oct. 23, 2020).

European Patent Office, Written Opinion in International Application No. PCT/EP2020/071844 (Oct. 23, 2020).

International Bureau of WIPO, International Preliminary Report on Patentability in International Application No. PCT/EP2020/071844 (Feb. 17, 2022).

* cited by examiner

POLYPROPYLENE-POLYETHYLENE BLENDS WITH IMPROVED PROPERTIES

CROSS-REFERENCE TO RELATED APPLICATIONS

This patent application is the U.S. national phase of International Application No. PCT/EP2020/071844, filed on Aug. 4, 2020, which claims the benefit of European Patent Application No. 19192203.8, filed Aug. 19, 2019, the disclosures of which are incorporated herein by reference in their entireties for all purposes.

The present invention relates to a polymer composition comprising as component A) a recycled polymer blend comprising polypropylene and polyethylene and as component B) a virgin random polypropylene copolymer, a process for manufacturing said polymer composition and to the use of a virgin random polypropylene copolymer for increasing mechanical properties of component A).

Polyolefins, in particular polyethylene and polypropylene are increasingly consumed in large amounts in a wide range of applications, including packaging for food and other goods, fibres, automotive components, and a great variety of manufactured articles. The reason for this is not only a favorable price/performance ratio, but also the high versatility of these materials and a very broad range of possible modifications, which allows tailoring of end-use properties in a wide range of applications. Chemical modifications, copolymerisation, blending, drawing, thermal treatment and a combination of these techniques can convert common-grade polyolefins into valuable products with desirable properties. This has led to huge amounts of polyolefin materials being produced for consumer applications.

During the last decade, concern about plastics and the environmental sustainability of their use in current quantities has arisen. This has led to new legislation on disposal, collection and recycling of polyolefins. In addition, there have been efforts in a number of countries to increase the percentage of plastic materials, which are recycled instead of being sent to landfill.

One major trend in the field of polyolefins is the use of recycled materials, which are derived from a wide variety of sources. Durable goods streams such as those derived from yellow bags, yellow bins, community collections, waste electrical equipment (WEE) or end-of-life vehicles (ELV) contain a wide variety of plastics. These materials can be processed to recover acrylonitrile-butadiene-styrene (ABS), high impact polystyrene (HIPS), polypropylene (PP) and polyethylene (PE) plastics. Separation can be carried out using density separation in water and then further separation based on fluorescence, near infrared absorption or Raman fluorescence techniques. However, it is commonly quite difficult to obtain either pure recycled polypropylene or pure recycled polyethylene.

Generally, recycled quantities of polypropylene on the market are mixtures of both polypropylene (PP) and polyethylene (PE), this is especially true for post-consumer waste streams. Commercial recyclates from post-consumer waste sources have been found generally to contain mixtures of PP and PE, the minor component reaching up to <50 wt.-%.

This means in general a polyolefin recyclate is always contaminated with the other type of polyolefin being either polyethylene or polypropylene. Moreover, cross contamination with non-PO materials such as polyethylene terephthalate, polyamide, polystyrene or non-polymeric substances like wood, paper, glass or aluminum is possible.

The better the quality of the recyclate gets the more expensive they are. Customers that are asking for recyclates request good mechanical properties. The prior art describes ways for improving the mechanical properties of recyclates.

EP 1 963 067 A1 refers to polyolefin compositions comprising, by weight: A) 30 to 80% of a polyolefin component containing not less than 80% of a waste material selected from polyethylene, polypropylene or their mixtures; B) 20 to 70% of a heterophasic polyolefin composition having flexural modulus equal to or lower than 600 MPa.

EP 1 495 074 A1 relates to techniques for creating recycled plastic materials from waste plastic materials. A recycled plastic material contains at least a primary polymer, a secondary polymer, and residual additives.

WO 2013/0252822 A1 refers to a process for creating polyolefin blends from waste streams with controlled rheological properties. Said process can include processing a waste stream to make a mixture comprising a mixture comprising polypropylene and polyethylene and compounding the mixture with one or more peroxides or nitroxides to produce a polyolefin blend.

WO 2015/169690 A1 relates to polypropylene-polyethylene blends comprising A) 75 to 90 wt.-% of a blend of A-1) polypropylene and A-2) polyethylene and B) 10 to 25 wt.-% of a compatibilizer being a heterophasic polyolefin composition comprising B-1) a polypropylene with an MFR2 between 1.0 and 300 g/10 min (according to ISO 1133 at 230° C. at a load of 2.16 kg) and B-2) a copolymer of ethylene and propylene or C4 to C10 alpha olefin with a Tg (measured with dynamic-mechanical thermal analysis, DMTA, according to ISO 6721-7) of below −25° C. and an intrinsic viscosity (measured in decalin according to DIN ISO 1628/1 at 135° C.) of at least 3.0 dl/g, whereby the blend has simultaneously increased Charpy Notched Impact Strength (according to ISO 179-1eA, measured at 23° C.), Flexural Modulus (according to ISO 178) as well as heat deflection resistance (determined with DMTA according to ISO 6721-7).

The known polymer compositions comprising recycled materials are not suited for a high-end market and inter alia due to their mechanical properties they are not able to compete with virgin materials. In addition, the available recyclates are facing problems in composition, for example fluctuation in PP and PE content, in consistency (in terms of flow properties), in their property profile (poor stiffness-impact balance), and in cross-contamination (such as non-polyolefinic components, inorganic materials such as aluminum or paper) but also in color and odor. Furthermore, the long-term stabilization of the materials known from the prior art is not so good that the materials could be subjected to further re-processing or recycling processes.

It was the objective of the present invention to overcome the disadvantages of the polymer compositions according to the prior art. In particular, it was one object of the present invention to provide polymer compositions having a high Tensile Strain at Break, whereas the toughness, expressed by the Charpy Notched Impact Strength, is on an acceptable level. Furthermore, it was object of the present invention to provide a polymer composition which allows to compensate the above-mentioned fluctuations. In addition, it was an object of the present invention to provide polymer compositions having a good long-term stabilization which can be subjected to further re-processing or recycling processes.

These objects have been solved by the polymer composition according to the present invention comprising at least the following components:

A) 20 to 75 wt.-% based on the overall weight of the polymer composition of a polymer blend, comprising
  a1) polypropylene;
  a2) polyethylene;
  wherein the weight ratio of a1) to a2) is from 3:7 to 12:1; and wherein the polymer blend A) is a recycled material;
B) 25 to 80 wt.-% based on the overall weight of the polymer composition of a virgin random polypropylene copolymer; whereby said virgin random polypropylene copolymer has
  a xylene soluble content (XCS) based on the overall weight of component B) in the range from 3.0 to 11.99 wt.-%;
  a MFR$_2$ (230° C., 2.16 kg) determined according to ISO 1133 in the range of 5 to 40 g/10 min;
  a C2-content in the range of 1.0 to 8.0 wt.-% based on the overall weight of component B) kJ/m$^2$;
with the proviso that the weight proportions of components A) and B) add up to 100 wt.-%.

Advantageous embodiments of the polymer composition in accordance with the present invention are specified herein.

The present invention also relates to a process for manufacturing a polymer composition, comprising the following steps:
  i) providing a polymer blend A) of a recycled material comprising a1) polypropylene and a2) polyethylene in a weight ratio of a1) to a2) from 3:7 to 12:1 in an amount of 20 to 75 wt.-%, based on the overall weight of the polymer composition;
  ii) providing a virgin random polypropylene copolymer in an amount of 25 to 80 wt.-%, based on the overall weight of the polymer composition; whereby said virgin random polypropylene copolymer has
    a MFR$_2$ (230° C., 2.16 kg) determined according to ISO 1133 in the range of 10 to 40 g/10 min;
    a xylene soluble content (XCS) determined according to ISO 16152, led, 25° C., based on the overall weight of component B) in the range of 0.1 to 5.0 wt.-%; and
    a melt peak temperature measured according to ISO 11357 in the range of 150 to 170° C.;
  iii) melting and mixing components A) and B) to obtain the polymer composition; and
  iv) optionally, cooling down the polymer composition obtained in step iii) and/or pelletizing the polymer composition.

Preferred embodiments of the process according to the present invention are also described herein.

The invention also relates to the use of a virgin random polypropylene copolymer; whereby said virgin random polypropylene copolymer has
  a xylene soluble content (XCS) based on the overall weight of component B) in the range from 3.0 to 11.99 wt.-%;
  a MFR$_2$ (230° C., 2.16 kg) determined according to ISO 1133 in the range of 5 to 40 g/10 min;
  has a C2-content in the range of 1.0 to 8.0 wt.-% based on the overall weight of component B) KJ/m$^2$;
for increasing
the Tensile Strain at Break measured according to ISO527-2; of a polymer blend A) of a recycled material comprising a1) polypropylene and a2) polyethylene in a weight ratio of a1) to a2) from 3:7 to 12:1;

whereby the a random polypropylene copolymer is present in amount of 25 to 80 wt.-% based on the overall weight of components A) and B).

Advantageous embodiments of said use, an article comprising the polymer composition according to the present invention, and preferred embodiments of said article are also described herein.

DEFINITIONS

Indications of Quantity

The polymer compositions in accordance with the present invention comprise the components A) and B) and optionally additives. The requirement applies here that the components A) and B) and if present the additives add up to 100 wt.-% in sum. The fixed ranges of the indications of quantity for the individual components A) and B) and optionally the additives are to be understood such that an arbitrary quantity for each of the individual components can be selected within the specified ranges provided that the strict provision is satisfied that the sum of all the components A), B) and optionally the additives add up to 100 wt.-%.

For the purposes of the present description and of the subsequent claims, the term "recycled" is used to indicate that the material is recovered from post-consumer waste and/or industrial waste. Namely, post-consumer waste refers to objects having completed at least a first use cycle (or life cycle), i.e. having already served their first purpose and been through the hands of a consumer; while industrial waste refers to the manufacturing scrap which does normally not reach a consumer. In the gist of the present invention "recycled polymers" may also comprise up to 17 wt.-%, preferably up to 3 wt.-%, more preferably up to 1 wt.-% and even more preferably up to 0.1 wt.-% based on the overall weight of the recycled polymer of other components originating from the first use. Type and amount of these components influence the physical properties of the recycled polymer. The physical properties given below refer to the main component of the recycled polymer.

Typical other components originating from the first use are thermoplastic polymers, like polystyrene (PS) and polyamide 6 (PA 6), talc, chalk, ink, wood, paper, limonene and fatty acids. The content of polystyrene and PA 6 in recycled polymers can be determined by Fourier Transform Infrared Spectroscopy (FTIR) and the content of talc, chalk, wood and paper may be measured by Thermogravimetric Analysis (TGA).

The term "virgin" denotes the newly produced materials and/or objects prior to first use and not being recycled. In case that the origin of the polymer is not explicitly mentioned the polymer is a "virgin" polymer.

Where the term "comprising" is used in the present description and claims, it does not exclude other non-specified elements of major or minor functional importance. For the purposes of the present invention, the term "consisting of" is considered to be a preferred embodiment of the term "comprising of". If hereinafter a group is defined to comprise at least a certain number of embodiments, this is also to be understood to disclose a group, which preferably consists only of these embodiments.

Whenever the terms "including" or "having" are used, these terms are meant to be equivalent to "comprising" as defined above.

Where an indefinite or definite article is used when referring to a singular noun, e.g. "a", "an" or "the", this includes a plural of that noun unless something else is specifically stated.

Component A)

The polymer composition in accordance with the present invention comprises as component A) 20 to 75 wt.-% based on the overall weight of the polymer composition of a polymer blend, comprising a1) polypropylene; a2) polyethylene; wherein the weight ratio of a1) to a2) is from 3:7 to 12:1; and wherein the polymer blend A) is a recycled material. In some preferred embodiments, the weight ratio of a1) to a2) is from 1:1 to 12:1, preferably from 2:1 to 11:1, more preferably from 5:1 to 10:1, still more preferably from 7:1 to 10:1, and most preferably from 8:1 to 9.5:1.

Preferred embodiments of component A) will be discussed in the following.

According to one preferred embodiment of the present invention component A) comprises 80.0 to 99.9 wt.-%, preferably 90.0 to 99.0 wt.-% and more preferably 94.0 to 98.0 wt.-% based on the overall weight of component A) of polypropylene a1) and polyethylene a2).

Another preferred embodiment of the present invention stipulates that component A) comprises less than 5 wt.-%, preferably less than 3 wt.-% and more preferably from 0.01 to 2 wt.-% based on the overall weight of component A) of thermoplastic polymers different from a1) and a2), more preferably less than 4.0 wt.-% PA 6 and less than 5 wt.-% polystyrene, still more preferably component A) comprises 0.5 to 3 wt.-% polystyrene.

According to still another preferred embodiment of the present invention component A) comprises less than 5 wt.-%, preferably 4 wt.-% or less and more preferably from 0.01 to 4 wt.-% based on the overall weight of component A) of talc.

In another preferred embodiment of the present invention component A) comprises less than 4 wt.-%, preferably less than 3 wt.-% and more preferably from 0.01 to 2 wt.-% based on the overall weight of component A) of chalk.

According to another preferred embodiment of the present invention component A) comprises less than 1 wt.-%, preferably less than 0.5 wt.-% and more preferably from 0.01 to 1 wt.-% based on the overall weight of component A) of paper.

Still another preferred embodiment of the present invention stipulates that component A) comprises less than 1 wt.-%, preferably less than 0.5 wt.-% and more preferably from 0.01 to 1 wt.-% based on the overall weight of component A) of wood.

In another preferred embodiment of the present invention component A) comprises less than 1 wt.-%, preferably less than 0.5 wt.-% and more preferably from 0.01 to 1 wt.-% based on the overall weight of component A) of metal.

A further preferred embodiment of the present invention stipulates that component A) comprises 100 ppm or less, based on the overall weight of component A), of limonene, as determined using solid phase microextraction (HS-SPME-GC-MS), such as 0.1 to 100 ppm of limonene. According to a preferred first embodiment, blend (A) has a content of limonene as determined by using solid phase microextraction (HS-SPME-GC-MS) of from 1 ppm to 100 ppm, preferably from 1 ppm to 50 ppm, more preferably from 2 ppm to 50 ppm, most preferably from 3 ppm to 35 ppm. In a second preferred embodiment, blend (A) has a content of limonene as determined by using solid phase microextraction (HS-SPME-GC-MS) of from 0.10 ppm to less than 1 ppm, preferably 0.10 to 0.85 ppm, most preferably 0.10 to 0.60 ppm.

Limonene is conventionally found in recycled polyolefin materials and originates from packaging applications in the field of cosmetics, detergents, shampoos and similar products. Therefore, blend (A) contains limonene, when blend (A) contains material that originates from such types of domestic waste streams. In the above second preferred embodiment, blend (A) has a content of limonene as determined by using solid phase microextraction (HS-SPME-GC-MS) of from 0.10 ppm to less than 1 ppm, preferably 0.10 to 0.85 ppm, most preferably 0.10 to 0.60 ppm. Blend (A) according to this second preferred embodiment can be prepared by subjecting blend (A) according to the above first preferred embodiment to washing and/or aeration. Washing can be effected by industrial washers such as provided by Herbold Meckesheim GmbH. Depending on the origin of the waste stream, several washing cycles may be necessary. Various aeration processes such as described in U.S. Pat. No. 5,767,230 are also known in the art. U.S. Pat. No. 5,767,230 is incorporated by reference herewith. The process as described in U.S. Pat. No. 5,767,230 is preferably combined with a washing stage as described above.

According to a further preferred embodiment of the present invention component A) comprises 200 ppm or less, preferably from 1 to 200 ppm based on the overall weight of component A) of fatty acids. In another embodiment, component A) comprises less than 200 ppm of fatty acids, based on the overall weight of component A).

Still another preferred embodiment of the present invention stipulates that component A) is a recycled material, which is recovered from waste plastic material derived from post-consumer and/or post-industrial waste.

According to a further preferred embodiment of the present invention the $MFR_2$ (230° C., 2.16 kg) determined according to ISO 1133 of component A) is in the range of 16 to 50 g/10 min and preferably in the range of 18 to 22 g/10 min.

In a further preferred embodiment of the present invention the Charpy Notched Impact Strength measured according to ISO 179-1eA at 23° C. of component A) is more than 3.0 $kJ/m^2$, preferably in the range from 4.0 to 7.0 $kJ/m^2$ and more preferably in the range from 5.0 to 6.0 $kJ/m^2$.

A further preferred embodiment of the present invention stipulates that the Tensile Modulus measured according to ISO527-2 of component A) is in the range of 800 to 1500 MPa and preferably in the range of 1100 to 1400 MPa.

According to still another preferred embodiment of the present invention the content of component A) in the polymer composition is in the range of 20 to 40 wt.-% and preferably in the range of 22 to 30 wt.-% based on the overall weight of the polymer composition.

Still a further preferred embodiment of the present invention stipulates that the content of polypropylene a1) in component A) is in the range from 75 to 95 wt.-% and preferably in the range from 83 to 93 wt.-% based on the overall weight of component A). The content of polypropylene a1) in component A) may be determined by FTIR spectroscopy as described in the experimental section. More, preferably component a1) comprises more than 95 wt.-%, preferably from 96 to 99.9 wt.-% isotactic polypropylene and most preferably consists of isotactic polypropylene.

In another preferred embodiment of the present invention the content of polyethylene a2) in component A) is in the range from 5 to 25 wt.-% and preferably in the range from 7 to 17 wt.-% based on the overall weight of component A). The content of polyethylene a2) in component A) may be determined by FTIR spectroscopy as described in the experimental section. More, preferably component a2) consists of homopolyethylene and ethylene containing copolymers.

Still a further preferred embodiment of the present invention stipulates that the weight ratio of polypropylene a1) to polyethylene a2) is from 1:1 to 12:1, preferably from 2:1 to 11:1, more preferably from 5:1 to 10:1, still more preferably from 7:1 to 10:1, and most preferably from 8:1 to 9.5:1.

Another preferred embodiment of the present invention stipulates that the melt enthalpy of component a2)/melt enthalpy of a1) in the polymer composition is in the range of 0.2 to 2.0 and preferably in the range of 0.25 to 1.75.

In a further preferred embodiment the polypropylene a1) comprises one or more polymer materials selected from the following:

I) isotactic or mainly isotactic propylene homopolymers;

II) isotactic random copolymers of propylene with ethylene and/or C4-C8 alpha-olefins, such as 1-butene or 1-octene, wherein the total comonomer content ranges from 0.05 to 20 wt.-%, or mixtures of said copolymers with isotactic or mainly isotactic propylene homopolymers;

III) heterophasic copolymers comprising an isotactic propylene homopolymer like (I) or random copolymers of propylene like (II), and an elastomeric fraction comprising copolymers of ethylene with propylene and/or a C4-C8 α-olefin, such as 1-butene or 1-octene, optionally containing minor amounts of a diene, such as butadiene, 1,4-hexadiene, 1,5-hexadiene, ethylidene-1-norbornene.

A further preferred embodiment of the present invention stipulates that component a1) has a density in the range of 0.895 to 0.920 g/cm$^3$, preferably in the range of 0.900 to 0.915 g/cm$^3$ as determined in accordance with ISO 1183.

According to still a further embodiment of the present invention the melt flow rate (MFR) of component a1) is in the range of 0.5 to 300 g/10 min, preferably in the range of 1.0 to 150 g/10 min and alternatively in the range of 1.5 to 50 g/10 min as determined in accordance with ISO 1133 (at 230° C.; 2.16 kg load).

In another preferred embodiment of the present invention the melting temperature of component a1) is within the range of 130 to 170° C., preferably in the range of 140 to 168° C. and more preferably in the range of 142 to 166° C. In case it is a propylene homopolymer like item (I) above it will have a melting temperature in the range of 150 to 170° C., preferably in the range from 155 to 168° C. and more preferably in the range of 160 to 166° C. as determined by differential scanning calorimetry (DSC) according to ISO 11357-3. In case it is a random copolymer of propylene like item (II) above it will have a melting temperature in the range of 130 to 162° C., preferably in the range of 135 to 160° C. and more preferably in the range of 140 to 158° C. as determined by DSC according to ISO 11357-3.

The polyethylene a2) is preferably a high density polyethylene (HDPE) or a linear low density polyethylene (LLDPE) or a long-chain branched low density polyethylene (LDPE). The comonomer content of component a2) is usually below 50 wt.-%, preferably below 25 wt.-%, and most preferably below 15 wt.-%.

Herein a HDPE suitable for use as component a2) has a density as determined according to ISO 1183 of equal to or greater than 0.941 g/cm$^3$, preferably in the range of 0.941 to 0.965 g/cm$^3$ and more preferably in the range of 0.945 to 0.960 g/cm$^3$.

According to another preferred embodiment, the HDPE is an ethylene homopolymer. A HDPE suitable for use as component a2) in this disclosure generally has a MFR determined by ISO 1133 (at 190° C.; 2.16 kg load), in the range of 0.01 g/10 min to 50 g/10 min, preferably in the range of 0.1 to 30 g/10 min, like in the range of 0.5 to 20 g/10 min.

The HDPE may also be a copolymer, for example a copolymer of ethylene with one or more alpha-olefin monomers such as propylene, butene, hexene, etc.

A LLDPE suitable for use as component a2) in this disclosure generally has a density as determined with ISO 1183, in the range of 0.900 to 0.920 g/cm$^3$, or in the range of 0.905 to 0.918 g/cm$^3$, or in the range of 0.910 to 0.918 g/cm$^3$ and an MFR determined by ISO 1133 (at 190° C.; 2.16 kg load), in the range of 0.01 to 50 g/min, or in the range of 0.1 to 30 g/10 min, like in the range of 0.5 to 20 g/10 min. The LLDPE is a copolymer, for example a copolymer of ethylene with one or more alpha-olefin monomers such as propylene, butene, hexene, etc.

A LDPE suitable for use as component a2) in this disclosure generally has a density as determined with ISO 1183, in the range of 0.915 to 0.935 g/cm$^3$, and an MFR determined by ISO 1133 (190° C.; 2.16 kg), in the range of 0.01 to 20 g/min. The LDPE is an ethylene homopolymer.

According to a further preferred embodiment the melting temperature of component a2) is in the range from 100 to 135° C. and preferably in the range from 105 to 132° C.

Such post-consumer and/or post-industrial waste can be derived from inter alia waste electrical and electronic equipment (WEEE) or end-of-life vehicles (ELV) or from differentiated waste collection schemes like the German DSD system, the Austrian ARA system and the Austrian ASZ system (especially for Purpolen materials) or the Italian "Raccolta Differenziata" system.

Recycled materials are commercially available, e.g. from Corpela (Italian Consortium for the collection, recovery, recycling of packaging plastic wastes), Resource Plastics Corp. (Brampton, ON), Kruschitz GmbH, Plastics and Recycling (AT), Ecoplast (AT), Vogt Plastik GmbH (DE), mtm plastics GmbH (DE) etc.

A preferred recycled polymer blend is Purpolen PP, being a recycled polymer mixture comprising polyethylene and polypropylene obtained from mtm plastics GmbH, Niedergebra, Germany.

Component B)

The polymer composition in accordance with the present invention comprises as component B) 25 to 80 wt.-% based on the overall weight of the polymer composition of a virgin random polypropylene copolymer; whereby said virgin random polypropylene copolymer has a xylene soluble content (XCS) based on the overall weight of component B) in the range from 3.0 to 11.99 wt.-%, a MFR$_2$ (230° C., 2.16 kg) determined according to ISO 1133 in the range of 5 to 40 g/10 min and a C2-content in the range of 1.0 to 8.0 wt.-% based on the overall weight of component B).

Preferred embodiments of component B) will be discussed in the following.

According to one preferred embodiment of the present invention component B) has a xylene soluble content (XCS) determined according to ISO 16152, led, 25° C., based on the overall weight of component B) in the range of 4.0 to 10.0 wt.-%, preferably in the range of 5.0 to 8.0 wt.-% and more preferably in the range of 5.5 to 7.5 wt.-%.

In another preferred embodiment of the present invention the MFR$_2$ (230° C., 2.16 kg) determined according to ISO 1133 of component B) is in the range of 10 to 20 g/10 min and preferably in the range of 11 to 15 g/10 min.

Another preferred embodiment of the present invention stipulates that component B) has a C2-content in the range of 1.5 to 7.0 wt.-%, preferably in the range of 2.0 to 5.0 wt.-% and more preferably in the range of 3.0 to 4.0 wt.-%.

According to a further preferred embodiment of the present invention component B) has a C3-content>85 wt.-%.

More preferably component B) comprises no other units than units derived from ethylene and propene. Still more preferably the C3-content in component B) is the range of 93.0 to 98.5 wt.-%, preferably in the range of 95.0 to 98.0 wt.-%, more preferably in the range of 96.0 to 97.0 wt.-%.

Still another preferred embodiment of the present invention stipulates that component B) has a Tensile Modulus measured according to ISO527-2 in the range of 800 to 1800 MPa, preferably in the range of 900 to 1500 MPa and more preferably in the range of 1000 to 1200 MPa.

According to a further preferred embodiment of the present invention component B) has a Tensile Strain at Break measured according to ISO527-2 in the range of 200 to 600%, preferably in the range of 300 to 500% and more preferably in the range of 400 to 500%.

In a further preferred embodiment of the present invention component B) has a Charpy Notched Impact Strength measured according to ISO 179-1eA at 23° C. in the range of 1.5 to 9.0 kJ/m$^2$, preferably in the range of 2.0 to 8.0 kJ/m$^2$ and more preferably in the range of 5.0 to 7.0 kJ/m$^2$.

Suitable conditions for manufacturing component B) are inter alia described in WO 2014/187686 A1 and WO 2014/187687 A1.

Component B) according to the present invention may be produced in a sequential polymerization process in the presence of a Ziegler-Natta catalyst as defined below.

Accordingly it is preferred that component B) is produced in the presence of (a) a Ziegler-Natta catalyst (ZN-C) comprising a titanium compound (TC), a magnesium compound (MC) and an internal donor (ID), wherein said internal donor (ID) is a non-phthalic acid ester, (b) optionally a co-catalyst (Co), and (c) optionally an external donor (ED).

Component B) may be produced in a sequential polymerization process comprising at least two reactors (R1) and (R2), in the first reactor (R1) the first propylene copolymer fraction (R-PP1) is produced and subsequently transferred into the second reactor (R2), in the second reactor (R2) the second propylene copolymer fraction (R-PP2) is produced in the presence of the first propylene copolymer fraction (R-PP1).

The term "sequential polymerization system" indicates that the propylene copolymer (R-PP) is produced in at least two reactors connected in series. Accordingly the present polymerization system comprises at least a first polymerization reactor (R1) and a second polymerization reactor (R2), and optionally a third polymerization reactor (R3). The term "polymerization reactor" shall indicate that the main polymerization takes place. Thus in case the process consists of two polymerization reactors, this definition does not exclude the option that the overall system comprises for instance a pre-polymerization step in a pre-polymerization reactor. The term "consist of" is only a closing formulation in view of the main polymerization reactors.

Preferably at least one of the two polymerization reactors (R1) and (R2) is a gas phase reactor (GPR). Still more preferably the second polymerization reactor (R2) and the optional third polymerization reactor (R3) are gas phase reactors (GPRs), i.e. a first gas phase reactor (GPR1) and a second gas phase reactor (GPR2). A gas phase reactor (GPR) according to this invention is preferably a fluidized bed reactor, a fast fluidized bed reactor or a settled bed reactor or any combination thereof.

A preferred multistage process is a "loop-gas phase"- process, such as developed by Borealis A/S, Denmark (known as BORSTAR® technology) described e.g. in patent literature, such as in EP 0 887 379 A1, WO 92/12182 A1, WO 2004/000899 A1, WO 2004/111095 A1, WO 99/24478 A1, WO 99/24479 A1 or in WO 00/68315 A1. A further suitable slurry-gas phase process is the Spheripol® process of Basell.

A process for manufacturing component B) may comprise the following steps under the conditions (a) in the first polymerization reactor (R1), i.e. in a loop reactor (LR), propylene and a comonomer being ethylene and/or a C$_4$ to C$_{12}$ α-olefin, preferably propylene and ethylene, are polymerized obtaining a first propylene copolymer fraction (R-PP1) of the propylene copolymer (R-PP), (b) transferring said first propylene copolymer fraction (R-PP1) to a second polymerization reactor (R2), (c) in the second polymerization reactor (R2) propylene and a comonomer being ethylene and/or a C$_4$ to C$_{12}$ α-olefin, preferably propylene and ethylene, are polymerized in the presence of the first propylene copolymer fraction (R-PP1) obtaining a second propylene copolymer fraction (R-PP2) of the propylene copolymer (R-PP), said first propylene copolymer fraction (R-PP1) and said second propylene copolymer fraction (R-PP2) form the propylene copolymer (R-PP).

A pre-polymerization as described above can be accomplished prior to step (a).

As pointed out above in the specific process for the preparation of component B) it is preferable to use Ziegler-Natta catalyst (ZN-C). Accordingly the Ziegler-Natta catalyst (ZN-C) will be now described in more detail.

The catalyst which may be used for preparing component B) is preferably a solid Ziegler-Natta catalyst (ZN-C), which comprises a titanium compound (TC), a magnesium compound (MC) and an internal donor (ID), wherein said internal donor (ID) is a non-phthalic acid ester, most preferably diester of non-phthalic dicarboxylic acids as described in more detail below. Thus, the catalyst used in the present invention is fully free of undesired phthalic compounds.

The Ziegler-Natta catalyst (ZN-C) can be further defined by the way as obtained. Accordingly the Ziegler-Natta catalyst (ZN-C) is preferably obtained by a process comprising the steps of a) providing a solution of at least one complex (A) being a complex of a magnesium compound (MC) and an alcohol comprising in addition to the hydroxyl moiety at least one further oxygen bearing moiety (A1) being different to a hydroxyl group, and optionally at least one complex (B) being a complex of said magnesium compound (MC) and an alcohol not comprising any other oxygen bearing moiety (B1), b) combining said solution with a titanium compound (TC) and producing an emulsion the dispersed phase of which contains more than 50 mol.-% of the magnesium;

c) agitating the emulsion in order to maintain the droplets of said dispersed phase preferably within an average size range of 5 to 200 μm;

d) solidifying said droplets of the dispersed phase;

e) recovering the solidified particles of the olefin polymerization catalyst component, and wherein an internal donor (ID) is added at any step prior to step c) and said internal donor (ID) is non-phthalic acid ester, preferably said internal donor (ID) is a diester of non-phthalic dicarboxylic acids as described in more detail below.

Detailed description as to how such a Ziegler-Natta catalyst (ZN-C) can be obtained is disclosed in WO 2012/007430 A1.

Additives

The polymer composition according to the present invention may also comprise additives.

According to a preferred embodiment of the present invention the polymer composition comprises at least one additive, preferably selected from the group consisting of slip agents, antiblocking agents, UV-stabilisers, pigments, antioxidants, anti-acids, additive carriers, nucleating agents and mixtures thereof, whereby these additives preferably are present in 0 to 5 wt.-% and more preferably in 0.1 to 4 wt.-% based on the overall weight of the polymer composition.

Examples of antioxidants which may be used, are sterically hindered phenols (such as CAS No. 6683-19-8, also sold as Irganox 1010 FF™ by BASF), phosphorous based antioxidants (such as CAS No. 31570-04-4, also sold as Hostanox PAR 24 (FF)™ by Clariant, or Irgafos 168 (FF)™ by BASF), sulphur based antioxidants (such as CAS No. 693-36-7, sold as Irganox PS-802 FL™ by BASF), nitrogen-based antioxidants (such as 4,4'-bis(1,1'-dimethylbenzyl) diphenylamine), or antioxidant blends.

Examples for anti-acids which may be used in the polymer compositions according to the present invention are calcium stearates, sodium stearates, zinc stearates, magnesium and zinc oxides, synthetic hydrotalcite (e.g. SHT, CAS-No. 11097-59-9), lactates and lactylates, as well as calcium stearate (CAS No. 1592-23-0) and zinc stearate (CAS No. 557-05-1).

Antiblocking agents that may be used in the polymer compositions according to the present invention are natural silica such as diatomaceous earth (such as CAS No. 60676-86-0 (SuperFloss™), CAS-No. 60676-86-0 (SuperFloss E™), or CAS-No. 60676-86-0 (Celite 499™)), synthetic silica (such as CAS-No. 7631-86-9, CAS-No. 7631-86-9, CAS-No. 7631-86-9, CAS-No. 7631-86-9, CAS-No. 7631-86-9, CAS-No. 7631-86-9, CAS-No. 112926-00-8, CAS-No. 7631-86-9, or CAS-No. 7631-86-9), silicates (such as aluminum silicate (Kaolin) CAS-no. 1318-74-7, sodium aluminum silicate CAS-No. 1344-00-9, calcined kaolin CAS-No. 92704-41-1, aluminum silicate CAS-No. 1327-36-2, or calcium silicate CAS-No. 1344-95-2), synthetic zeolites (such as sodium calcium aluminosilicate hydrate CAS-No. 1344-01-0, CAS-No. 1344-01-0, or sodium calcium aluminosilicate, hydrate CAS-No. 1344-01-0).

UV-stabilizers which might be used in the polymer compositions according to the present invention are, for example, Bis-(2,2,6,6-tetramethyl-4-piperidyl)-sebacate (CAS-No. 52829-07-9, Tinuvin 770); 2-hydroxy-4-(octyloxy)benzophenone (CAS-No. 1843-05-6, Chimassorb 81).

Nucleating agents that can be used in the polymer compositions according to the present invention are for example sodium benzoate (CAS No. 532-32-1) or 1,3:2,4-bis(3,4-dimethylbenzylidene)sorbitol (CAS 135861-56-2, Millad 3988).

Suitable antistatic agents are, for example, glycerol esters (CAS No. 97593-29-8) or ethoxylated amines (CAS No. 71786-60-2 or 61791-31-9) or ethoxylated amides (CAS No. 204-393-1).

Polymer Composition

Below preferred embodiments of the polymer composition according to the present invention will be discussed.

According to one preferred embodiment of the present invention the polymer composition has a MFR$_2$ (230° C., 2.16 kg) determined according to ISO 1133 in the range of 1 to 50 g/10 min, preferably in the range of 1.5 to 35 g/10 min, more preferably in the range of 10 to 30 g/10 min and most preferably in the range of 12 to 17 g/10 min.

In another preferred embodiment of the present invention the polymer composition has a Tensile Modulus measured according to ISO527-2 in the range of 800 to 1800 MPa and preferably in the range of 1000 to 1200.

Still another preferred embodiment of the present invention stipulates that the polymer composition has a Charpy Notched Impact Strength measured according to ISO 179-1eA at 23° C. of more than 2.0 kJ/m$^2$, preferably in the range of 2.0 to 15.0 kJ/m$^2$ and more preferably in the range of 4.0 to 6.0 kJ/m$^2$.

According to another preferred embodiment of the present invention the polymer composition has a Tensile Strain at Break measured according to ISO527-2 in the range of 100 to 600%, preferably in the range of 200 to 550% and more preferably in the range of 300 to 450%.

In another preferred embodiment of the present invention the polymer composition has a higher Tensile Strain at Break measured according to ISO527-2, preferably at least 500% higher, more preferably from 1000 to 2500% higher than the same polymer composition without component B).

According to a further preferred embodiment of the present invention the content of component A) in the polymer composition is in the range of 20 to 40 wt. % and preferably in the range from 22 to 30 wt.-% based on the overall weight of the polymer composition.

In another preferred embodiment of the present invention the content of component B) in the polymer composition is in the range of 60 to 80 wt.-% and preferably in the range from 70 to 78 wt. % based on the overall weight of the polymer composition.

A preferred polymer composition according to the present invention comprises at least the following components A) 20 to 40 wt.-%, preferably 22 to 26 wt. % based on the overall weight of the polymer composition of a polymer blend, comprising
  a1) polypropylene;
  a2) polyethylene;
wherein the weight ratio of a1) to a2) is from 3:7 to 12:1, preferably from 1:1 to 12:1, more preferably from 2:1 to 11:1, still more preferably from 5:1 to 10:1, still further preferably from 7:1 to 10:1, and most preferably from 8:1 to 9.5:1; and wherein the polymer blend A) is a recycled material;

B) 60 to 80 wt.-%, preferably 74 to 78 wt.-% based on the overall weight of the polymer composition of a virgin random polypropylene copolymer; whereby said virgin random polypropylene copolymer has
  a xylene soluble content (XCS) based on the overall weight of component B) in the range from 4.0 to 10.00 wt.-% and preferably in the range of 5.5 to 7.5 wt.-%;
  a MFR$_2$ (230° C., 2.16 kg) determined according to ISO 1133 in the range of 10 to 20 g/10 min and preferably in the range of 11 to 15 g/10 min;
  a C2-content in the range of 1.5 to 7.0 wt.-% and preferably in the range of 3.0 to 4.0 wt.-% based on the overall weight of component B) kJ/m$^2$;
with the proviso that the weight proportions of components A) and B) add up to 100 wt.-%.

A further preferred polymer composition according to the present invention consists of the following components 20 to 40 wt.-%, preferably 22 to 26 wt.-% based on the overall weight of the polymer composition of a polymer blend, comprising a1) polypropylene;

a2) polyethylene;

wherein the weight ratio of a1) to a2) is from 3:7 to 12:1, preferably from 1:1 to 12:1, more preferably from 2:1 to 11:1, still more preferably from 5:1 to 10:1, still further preferably from 7:1 to 10:1, and most preferably from 8:1 to 9.5:1; and wherein the polymer blend A) is a recycled material;

60 to 80 wt.-%, preferably 74 to 78 wt.-% based on the overall weight of the polymer composition of a virgin random polypropylene copolymer; whereby said virgin random polypropylene copolymer has a xylene soluble content (XCS) based on the overall weight of component B) in the range from 4.0 to 10.00 wt.-% and preferably in the range of 5.5 to 7.5 wt.-%;

a $MFR_2$ (230° C., 2.16 kg) determined according to ISO 1133 in the range of 10 to 20 g/10 min and preferably in the range of 11 to 15 g/10 min;

a C2-content in the range of 1.5 to 7.0 wt.-% and preferably in the range of 3.0 to 4.0 wt.-% based on the overall weight of component B) $kJ/m^2$;

0 to 2 wt.-%, preferably 0.1 to 1.5 wt.-% of additives selected from the group consisting of slip agents, antiblocking agents, UV-stabilisers, pigments, antioxidants, anti-acids, additive carriers, nucleating agents, preferably antioxidants;

with the proviso that the weight proportions of components A), B) and C) add up to 100 wt.-%.

Process

The process for manufacturing a polymer composition according to the present invention comprises the following steps:

i) providing a polymer blend A) of a recycled material comprising a1) polypropylene and a2) polyethylene in a weight ratio of a1) to a2) from 3:7 to 12:1 in an amount of 20 to 75 wt.-% based on the overall weight of the polymer composition;

ii) providing a virgin random polypropylene copolymer in an amount of 25 to 80 wt.-% based on the overall weight of the polymer composition; whereby said virgin random polypropylene copolymer has a $MFR_2$ (230° C., 2.16 kg) determined according to ISO 1133 in the range of 10 to 40 g/10 min;

a xylene soluble content (XCS) determined according to ISO 16152, led, 25° C., based on the overall weight of component B) in the range of 0.1 to 5.0 wt.-%; and a melt peak temperature measured according to ISO 11357 in the range of 150 to 170° C.;

iii) melting and mixing components A) and B) to obtain the polymer composition; and iv) optionally, cooling down the polymer composition obtained in step iii) and/or pelletizing the polymer composition.

According to a preferred embodiment of the process according to the present invention component B) has a xylene soluble content (XCS) determined according to ISO 16152, led, 25° C., based on the overall weight of component B) in the range of 4.0 to 10.0 wt.-%, preferably in the range of 5.0 to 8.0 wt.-% and more preferably in the range of 5.5 to 7.5 wt.-%.

Still another preferred embodiment of the process according to the present invention stipulates that the $MFR_2$ (230° C., 2.16 kg) determined according to ISO 1133 of component B) is in the range of 10 to 20 g/10 min and preferably in the range of 11 to 15 g/10 min.

According to a further preferred embodiment of the process according to the present invention component B) has a C2-content in the range of 1.5 to 7.0 wt.-%, preferably in the range of 2.0 to 5.0 wt.-% and more preferably of 3.0 to 4.0 wt.-%.

Still another preferred embodiment of the process according to the present invention stipulates that component B) has a Tensile Modulus measured according to ISO527-2 in the range of 800 to 1800 MPa, preferably in the range of 900 to 1500 MPa and more preferably in the range of 1000 to 1200 MPa.

In a further preferred embodiment of the process according to the present invention component B) has a Tensile Strain at Break measured according to ISO527-2 in the range of 200 to 600%, preferably in the range of 300 to 500% and more preferably in the range of 400 to 500%.

According to a further preferred embodiment of the process according to the present invention component B) has a Charpy Notched Impact Strength measured according to ISO 179-1eA at 23° C. in the range of 1.5 to 9.0 $kJ/m^2$, preferably in the range of 2.0 to 8.0 $kJ/m^2$ and more preferably in the range of 5.0 to 7.0 $kJ/m^2$.

According to another preferred embodiment of the process according to the present invention the chemical composition of component A) and/or the $MFR_2$ (230° C., 2.16 kg) determined according to ISO 1133 and/or the Tensile Strain at Break measured according to ISO527-2 is/are determined before adding component (B).

The composition of the commercially available recyclates is subject to slight fluctuations. The determination of the mechanical properties and/or the MFR of component A) before adding component B) allows to compensate these fluctuations by adding an appropriate amount of component B).

All preferred aspects and embodiments as described above shall also hold for the process according to the present invention.

Use

The present invention also relates to the use of a virgin random polypropylene copolymer; whereby said virgin random polypropylene copolymer has a xylene soluble content (XCS) based on the overall weight of component B) in the range from 3.0 to 11.99 wt.-%;

a $MFR_2$ (230° C., 2.16 kg) determined according to ISO 1133 in the range of 5 to 40 g/10 min;

a C2-content in the range of 1.0 to 8.0 wt.-% based on the overall weight of component B) $kJ/m^2$;

for increasing the Tensile Strain at Break measured according to ISO527-2;

of a polymer blend A) of a recycled material comprising a1) polypropylene and a2) polyethylene in a weight ratio of a1) to a2) from 3:7 to 12:1;

whereby the a random polypropylene copolymer is present in amount of 25 to 80 wt.-% based on the overall weight of components A) and B).

According to a preferred embodiment of the use according to the present invention the Tensile Modulus of component A) measured according to ISO527-2 is increased by at least 500% and preferably by 900 to 2000%.

Still another preferred embodiment of the use according to the present invention stipulates that component B) has a xylene soluble content (XCS) determined according to ISO 16152, led, 25° C., based on the overall weight of component B) in the range of 4.0 to 10.0 wt.-%, preferably in the range of 5.0 to 8.0 wt.-% and more preferably in the range of 5.5 to 7.5 wt.-%.

In a further preferred embodiment of the use according to the present invention the $MFR_2$ (230° C., 2.16 kg) determined according to ISO 1133 of component B) is in the range of 10 to 20 g/10 min and preferably in the range of 11 to 15 g/10 min.

According to a further preferred embodiment of the use according to the present invention component B) has a C2-content in the range of 1.5 to 7.0 wt.-%, preferably in the range of 2.0 to 5.0 wt.-% and more preferably in the range of 3.0 to 4.0 wt.-%.

Still another preferred embodiment of the use according to the present invention stipulates that component B) has a Tensile Modulus measured according to ISO527-2 in the range of 800 to 1800 MPa, preferably in the range of 900 to 1500 MPa and more preferably in the range of 1000 to 1200 MPa.

In a further preferred embodiment of the use according to the present invention component B) has a Tensile Strain at Break measured according to ISO527-2 in the range of 200 to 600%, preferably in the range of 300 to 500% and more preferably in the range of 400 to 500%.

According to a further preferred embodiment of the use according to the present invention component B) has a Charpy Notched Impact Strength measured according to ISO 179-1eA at 23° C. in the range of 1.5 to 9.0 kJ/m², preferably in the range of 2.0 to 8.0 kJ/m² and more preferably in the range of 5.0 to 7.0 kJ/m².

All preferred aspects and embodiments as described above shall also hold for the use according to the present invention.

Article

The present invention also relates to an article comprising the polymer composition according to the present invention. It is preferred that the article comprises at least 95 wt.-% based on its overall weight of the polymer composition according to the present invention.

According to a preferred embodiment of the present invention the article is selected from the group consisting of consumer goods or houseware, preferably caps, closures and packaging containers, more preferably thin wall packaging containers.

The invention will now be described with reference to the following non-limiting examples.

Experimental Part

A. Measuring Methods

The following definitions of terms and determination methods apply for the above general description of the invention as well as to the below examples unless otherwise defined.

Melt Flow Rate (MFR)

MFR was measured according to ISO 1133 at a load of 2.16 kg, at 230° C. for polypropylene and MFR was measured according to ISO 1133 at a load of 2.16 kg at 190° C. for polyethylene.

Melting Temperature $T_m$, Crystallization Temperature $T_c$ and Melting Enthalpy $H_m$ The melting temperature was determined with a TA Instrument Q2000 differential scanning calorimetry (DSC) on 5 to 7 mg samples. DSC is run according to ISO 11357/part 3/method C2 in a heat/cool/heat cycle with a scan rate of 10° C./min in the temperature range of –30 to +225° C. Crystallization temperature ($T_c$) is determined from the cooling step, while melting temperature ($T_m$) and melting enthalpy ($H_m$) are determined from the second heating step. For calculating the melting enthalpy 50° C. is used as lower integration limit. Melting and crystallization temperatures were taken as the peaks of endotherms and exotherms.

Tensile Modulus, Tensile Strength, Tensile Strain at Break, Tensile Stress at Yield, Tensile Stress at Break The measurements were conducted after 96 h conditioning time (at 23° C. at 50% relative humidity) of the test specimen.

Tensile Modulus was measured according to ISO 527-2 (cross head speed=1 mm/min; 23° C.) using injection molded specimens as described in EN ISO 1873-2 (dog bone shape, 4 mm thickness).

Tensile Strength was measured according to ISO 527 using injection molded specimens as described in EN ISO 1873-2 (170×10×4 mm).

Tensile Strain at Break was measured according to ISO 527-2 (cross head speed=50 mm/min; 23° C.) using injection molded specimens as described in EN ISO 1873-2 (dog bone shape, 4 mm thickness).

Tensile Stress at Yield

Tensile Stress at Yield was determined according to ISO 527-2 (cross head speed=50 mm/min) using injection molded specimens as described in EN ISO 1873-2 (dog bone shape, 4 mm thickness).

Tensile Stress at Break was determined according to ISO 527-2 (cross head speed=50 mm/min) on samples prepared from compression-molded plaques having a sample thickness of 4 mm.

Charpy Notched Impact Strength

Charpy Notched impact strength was determined after conditioning (at 23° C. at 50% relative humidity) according to ISO 179 1eA at 23° C. and 0° C. using 80×10×4 mm³ test bars injection molded in line with EN ISO 1873-2.

HDT B

Heat Deflection Temperature (HDT) was determined according to ISO 75 B with a load of 0.45 MPa using 80×10×4 mm³ test bars injection molded in line with EN ISO 1873-2.

Xylene Cold Solubles (XCS)

The xylene soluble (XS) fraction as defined and described in the present invention is determined in line with ISO 16152 as follows: 2.0 g of the polymer were dissolved in 250 ml p-xylene at 135° C. under agitation. After 30 minutes, the solution was allowed to cool for 15 minutes at ambient temperature and then allowed to settle for 30 minutes at 25+/–0.5° C. The solution was filtered with filter paper into two 100 ml flasks. The solution from the first 100 ml vessel was evaporated in nitrogen flow and the residue dried under vacuum at 90° C. until constant weight is reached. The xylene soluble fraction (percent) can then be determined as follows: XS %=$(100*m*V_0)/(m_0*v)$; $m_0$=initial polymer amount (g); m=weight of residue (g); $V_0$=initial volume (ml); v=volume of analyzed sample (ml).

Determination of the C2- and C3-Content in Component B) by NMR

Quantitative nuclear-magnetic resonance (NMR) spectroscopy was used to quantify the comonomer content and comonomer sequence distribution of the polymers. Quantitative $^{13}C\{^1H\}$ NMR spectra were recorded in the solution-state using a Bruker Avance III 400 NMR spectrometer operating at 400.15 and 100.62 MHz for $^1H$ and $^{13}C$ respectively. All spectra were recorded using a $^{13}C$ optimized 10 mm extended temperature probehead at 125° C. using nitrogen gas for all pneumatics. Approximately 200 mg of material was dissolved in 3 ml of 1,2-tetrachloroethane-$d_2$ (TCE-$d_2$) along with chromium-(III)-acetylacetonate $(Cr(acac)_3)$ resulting in a 65 mM solution of relaxation agent in solvent (Singh, G., Kothari, A., Gupta, V., Polymer Testing 28 5 (2009), 475). To ensure a homogenous solution, after initial sample preparation in a heat block, the NMR tube was further heated in a rotary oven for at least 1 hour. Upon insertion into the magnet the tube was spun at 10 Hz. This setup was chosen primarily for the high resolution and quantitatively needed for accurate ethylene content quantification. Standard single-pulse excitation was employed without NOE, using an optimized tip angle, 1 s recycle delay and a bi-level WALTZ16 decoupling scheme (Zhou, Z., Kuemmerle, R., Qiu, X., Redwine, D., Cong, R., Taha, A., Baugh, D. Winniford, B., J. Mag. Reson. 187 (2007) 225; Busico, V., Carbonniere, P., Cipullo, R., Pellecchia, R., Severn, J., Talarico, G., Macromol. Rapid Commun. 2007, 28, 1128). A total of 6144 (6 k) transients were acquired per spectra.

Quantitative $^{13}C\{^1H\}$ NMR spectra were processed, integrated and relevant quantitative properties determined from the integrals using proprietary computer programs. All chemical shifts were indirectly referenced to the central methylene group of the ethylene block (EEE) at 30.00 ppm using the chemical shift of the solvent. This approach allowed comparable referencing even when this structural unit was not present. Characteristic signals corresponding to the incorporation of ethylene were observed Cheng, H. N., Macromolecules 17 (1984), 1950).

The comonomer fraction was quantified using the method of Wang et. al. (Wang, W-J., Zhu, S., Macromolecules 33 (2000), 1157) through integration of multiple signals across the whole spectral region in the $^{13}C\{^1H\}$ spectra. This method was chosen for its robust nature and ability to account for the presence of regio-defects when needed. Integral regions were slightly adjusted to increase applicability across the whole range of encountered comonomer contents.

For systems where only isolated ethylene in PPEPP sequences was observed the method of Wang et. al. was modified to reduce the influence of non-zero integrals of sites that are known to not be present. This approach reduced the overestimation of ethylene content for such systems and was achieved by reduction of the number of sites used to determine the absolute ethylene content to:

$$E=0.5(S\beta\beta+S\beta\gamma+S\beta\delta+0.5(S\alpha\beta+S\alpha\gamma))$$

Through the use of this set of sites the corresponding integral equation becomes:

$$E=0.5(I_H+I_G+0.5(I_C+I_D))$$

using the same notation used in the article of Wang et. al. (Wang, W-J., Zhu, S., Macromolecules 33 (2000), 1157). Equations used for absolute propylene content were not modified.

The mole percent comonomer incorporation was calculated from the mole fraction:

$$E[mol-\%]=100*fE$$

The weight percent comonomer incorporation was calculated from the mole fraction:

$$E[wt.-\%]=100*(fE*28.06)/((fE*28.06)+((1-fE)*42.08))$$

Determination of the Content of Isotactic Polypropylene (iPP), Polystyrene (PS), Ethylene and Polyamide-6 in Component A)

Calibration standards were prepared by blending iPP and HDPE to create a calibration curve. The thickness of the films of the calibration standards were 300 μm. For the quantification of the iPP, PS and PA 6 content in the samples quantitative IR spectra were recorded in the solid-state using a Bruker Vertex 70 FTIR spectrometer. Spectra were recorded on 25×25 mm square films of 50-100 μm thickness prepared by compression molding at 190° C. and 4 to 6 mPa.

Standard transmission FTIR spectroscopy was employed using a spectral range of 4000 to 400 $cm^{-1}$, an aperture of 6 mm, a spectral resolution of 2 $cm^{-1}$ 16 background scans, 16 spectrum scans, an interferogram zero filling factor of 32 and Norton Beer strong apodisation.

The absorption of the band at 1167 $cm^{-1}$ in iPP was measured and the iPP content was quantified according to a calibration curve (absorption/thickness in cm versus iPP content in wt.-%).

The absorption of the band at 1601 $cm^{-1}$ (PS) and 3300 $cm^{-1}$ (PA6) were measured and the PS- and PA6 content quantified according to the calibration curve (absorption/thickness in cm versus PS and PA content in wt.-%). The content of ethylene was obtained by subtracting the content of iPP, PS and PA6 from 100. The analysis was performed as double determination.

Amount of Talc and Chalk

The amount of talc and chalk were measured by Thermogravimetric Analysis (TGA); experiments were performed with a Perkin Elmer TGA 8000. Approximately 10 to 20 mg of material was placed in a platinum pan. The temperature was equilibrated at 50° C. for 10 minutes, and afterwards raised to 950° C. under nitrogen at a heating rate of 20° C./min. The weight loss between ca. 550° C. and 700° C. (WCO2) was assigned to CO2 evolving from CaCO3, and therefore the chalk content was evaluated as:

$$Chalk\ content=100/44\times WCO2$$

Afterwards the temperature was lowered to 300° C. at a cooling rate of 20° C./min. Then the gas was switched to oxygen, and the temperature was raised again to 900° C. The weight loss in this step was assigned to carbon black (Wcb). Knowing the content of carbon black and chalk, the ash content excluding chalk and carbon black was calculated as:

$$Ash\ content=(Ash\ residue)-56/44\times WCO2-Wcb$$

Where Ash residue is the wt.-% measured at 900° C. in the first step conducted under nitrogen. The ash content is estimated to be the same as the talc content for the investigated recyclates.

Amount of Paper, Wood

Paper and wood is determined by conventional laboratory methods including milling, floatation, microscopy and Thermogravimetric Analysis (TGA).

Amount of Metals

The amount of metals is determined by x ray fluorescence (XRF).

Amount of Limonene

The amount of limonene is determined by solid phase microextraction (HS-SPME-GC-MS).

Amount of Total Fatty Acids

The amount of total fatty acids is determined by solid phase microextraction (HS-SPME-GC-MS).

B. Materials Used

Component A)

Polymer Blend (Purpolen)

Purpolen PP is a recycled polymer mixture comprising polyethylene and polypropylene obtained from mtm plastics GmbH, Niedergebra, Germany.

| | content of component a1) determined by FTIR | content of component a2) determined by FTIR |
| --- | --- | --- |
| Purpolen 1 | 86.8 wt.-% | 12.0 wt.-% |
| Purpolen 2 | 84.4 wt.-% | 14.5 wt.-% |

Purpolen and 2 each individually add up with PS and PA 6 (content also determined by FTIR) to 100 wt.-%.

Component B)

The heterophasic polypropylene random copolymer used as "Component B" in the Working Examples (IE1 to IE3) was prepared in a sequential process comprising a prepolymerisation reactor, a loop reactor and a gas phase reactor (GPR1).

The catalyst used in the polymerization process for manufacturing component B) as used in inventive examples IE1 to IE3 was prepared as follows.

Used Chemicals:

20% solution in toluene of butyl ethyl magnesium (Mg (Bu)(Et), BEM), provided by Chemtura 2-ethylhexanol, provided by Amphochem 3-Butoxy-2-propanol—(DOWANOL™ PnB), provided by Dow Chemicals bis(2-ethylhexyl)citraconate, provided by SynphaBase TiCl$_4$, provided by Millenium Chemicals Toluene, provided by Aspokem Viscoplex® 1-254, provided by Evonik Heptane, provided by Chevron Preparation of the Mg Alkoxy Compound Mg alkoxide solution was prepared by adding, with stirring (70 rpm), into 11 kg of a 20 wt-% solution in toluene of butyl ethyl magnesium (Mg(Bu)(Et)), a mixture of 4.7 kg of 2-ethylhexanol and 1.2 kg of butoxypropanol in a 20 l stainless steel reactor. During the addition the reactor contents were maintained below 45° C. After addition was completed, mixing (70 rpm) of the reaction mixture was continued at 60° C. for 30 minutes. After cooling to room temperature 2.3 kg g of the donor bis(2-ethylhexyl)citraconate was added to the Mg-alkoxide solution keeping temperature below 25° C. Mixing was continued for 15 minutes under stirring (70 rpm).

Preparation of Solid Catalyst Component 20.3 kg of TiCl$_4$ and 1.1 kg of toluene were added into a 20 l stainless steel reactor. Under 350 rpm mixing and keeping the temperature at 0° C., 14.5 kg of the Mg alkoxy compound prepared in example 1 was added during 1.5 hours. 1.7 l of Viscoplex® 1-254 and 7.5 kg of heptane were added and after 1 hour mixing at 0° C. the temperature of the formed emulsion was raised to 90° C. within 1 hour. After 30 minutes mixing was stopped catalyst droplets were solidified and the formed catalyst particles were allowed to settle. After settling (1 hour), the supernatant liquid was siphoned away. Then the catalyst particles were washed with 45 kg of toluene at 90° C. for 20 minutes followed by two heptane washes (30 kg, 15 min). During the first heptane wash the temperature was decreased to 50° C. and during the second wash to room temperature.

The thus obtained catalyst was used along with triethylaluminium (TEAL) as co-catalyst and di(cyclopentyl) dimethoxy silane (D-donor) as donor.

The molar ratio of co-catalyst (Co) to external donor (ED) [Co/ED] and the molar ratio of co-catalyst (Co) to titanium compound (TC) [Co/TC] are indicated in Table 2. The polymerization conditions are also indicated in Table 2.

TABLE 2

Preparation of the heterophasic propylene block copolymer "Component B".

| Parameter | unit | Component B |
|---|---|---|
| Prepolymerisation | | |
| temperature | [° C.] | 20 |
| pressure | [bar] | 55 |
| Al/donor ratio | [mol/mol] | 10 |
| Al/Ti ratio | [mol/mol] | 80 |
| residence time | [h] | 0.3 |
| Loop | | |
| temperature | [° C.] | 70 |
| pressure | [bar] | 55 |
| residence time | [h] | 0.4 |
| H2/C3 ratio | [mol/kmol] | 2.5 |
| C2/C3 ratio | [mol/kmol] | 3.8 |
| C2 | [wt-%] | 2.8 |
| XCS | [wt.-%] | 5.5 |
| MFR | [g/10 min] | 13 |
| Split | [wt.-%] | 45 |
| GPR1 | | |
| temperature | [° C.] | 85 |
| pressure | [bar] | 21 |
| residence time | [h] | 2.0 |
| H2/C3 ratio | [mol/kmol] | 6.3 |
| C2/C3 ratio | [mol/kmol] | 3.8 |
| C2 | [wt-%] | 16.7 |
| XCS | [wt.-%] | 5.5 |
| MFR | [g/10 min] | 13 |
| Split | [wt.-%] | 55 |

TABLE 3

Properties of the heterophasic propylene random copolymer "Component B".

| Physical property | unit | "Component B" |
|---|---|---|
| MFR (230° C., 2.16 kg) | [g/10 min] | 13 |
| XCS total | [wt %] | 6.5 |
| C2 | [wt-%] | 3.7 |
| density | [kg/m$^3$] | 905 |

Further Components

Antioxidant (AO1)

AO1 is Irganox 1010, commercially available from BASF SE.

Antioxidant (A02)

AO 2 is Irgafos 168, commercially available from BASF SE.

C) Preparation of the Polymer Compositions

The polymer compositions according to the inventive examples (IE1 to IE3) and the comparative example (CE1) were prepared on a Coperion ZSK 25 co-rotating twin-screw extruder equipped with a mixing screw configuration with an L/D ratio of 25. A melt temperature of 170 to 225° C. was used during mixing, solidifying the melt strands in a water bath followed by strand pelletization. The amounts of the different components in the polymer compositions and the properties of the polymer compositions according to the inventive examples and the comparative examples can be gathered from below Table 4.

TABLE 4

Composition and properties of the polymer compositions

| | Unit | IE1 | IE2 | IE3 | CE1 |
|---|---|---|---|---|---|
| Component | | | | | |
| Purpolen 1 (A) | wt.-% | — | — | 26.05 | — |
| Purpolen 2 (A) | wt.-% | — | 26.05 | — | 100 |
| Purpolen 3 (A) | wt.-% | 26.05 | — | — | — |
| Component (B) | wt.-% | 73.65 | 73.65 | 73.65 | — |
| AO1 | wt.-% | 0.15 | 0.15 | 0.15 | — |
| AO2 | wt.-% | 0.15 | 0.15 | 0.15 | — |
| Properties | | | | | |
| MFR2 | g/10 min | 15.2 | 15.2 | 15.1 | 20.7 |
| Tensile Strain at Break | % | 404 | 371 | 331 | 20 |
| Tensile Modulus | MPa | 1163 | 1150 | 1137 | 1320 |
| Tensile Strength | MPa | 28.2 | 28.1 | 27.9 | 25.8 |
| Tensile Stress at Break | MPa | 17.0 | 16.9 | 16.4 | 19.0 |
| Tensile Stress at Yield | MPa | 28.2 | 28.1 | 27.9 | 25.8 |
| HDT B | ° C. | 75.3 | 74.8 | 74.1 | n.d. |
| Charpy NIS 23° C. | kJ/m$^2$ | 5.3 | 4.5 | 4.7 | 5.6 |
| Charpy NIS 0° C. | kJ/m$^2$ | 1.4 | 1.4 | 1.4 | n.d. | n.d. = not determined.

D) Discussion of the Results

As can be gathered from Table 4, the polymer compositions according to inventive examples IE1 to IE3 show a much higher Tensile Strain at Break, than the polymer composition according to comparative example CE1. In addition, the Charpy Notch Impact Strength and the further tensile properties according to the inventive examples are on an acceptable level.

The invention claimed is:

1. A polymer composition comprising at least the following components

A) 20 to 75 wt.-% based on the overall weight of the polymer composition of a polymer blend, comprising
  a1) polypropylene;
  a2) polyethylene;
  wherein the weight ratio of a1) to a2) is from 3:7 to 12:1; and
  wherein the polymer blend A) is a recycled material;

B) 25 to 80 wt.-% based on the overall weight of the polymer composition of a virgin random polypropylene copolymer; whereby said virgin random polypropylene copolymer has
  a xylene soluble content (XCS) based on the overall weight of component B) in the range from 3.0 to 11.99 wt.-%;
  a MFR$_2$ (230° C., 2.16 kg) determined according to ISO 1133 in the range of 11 to 40 g/10 min;
  a C2-content in the range of 1.0 to 8.0 wt.-% based on the overall weight of component B);
  with the proviso that the weight proportions of components A) and B) add up to 100 wt.-%.

2. The polymer composition according to claim 1, wherein
  component B) has a xylene soluble content (XCS) determined according to ISO 16152, led, 25° C., based on the overall weight of component B) in the range of 4.0 to 10.0 wt.-%; and/or
  the MFR$_2$ (230° C., 2.16 kg) determined according to ISO 1133 of component B) is in the range of 11 to 20 g/10 min; and/or component B) has a C2-content in the range of 1.5 to 7.0 wt.-%, and/or component B) has a Tensile Modulus measured according to ISO527-2 in the range of 800 to 1800 MPa; and/or
component B) has a Tensile Strain at Break measured according to ISO527-2 in the range of 200 to 600%; and/or
component B) has a Charpy Notched Impact Strength measured according to ISO 179-1eA at 23° C. in the range of 1.5 to 9.0 KJ/m$^2$.

3. The polymer composition according to claim 1 wherein
component A) comprises 80.0 to 99.9 wt.-%, based on the overall weight of component A) of polypropylene a1) and polyethylene a2); and/or
component A) comprises less than 5 wt.-%, based on the overall weight of component A) of thermoplastic polymers different from a1) and a2); and/or
component A) comprises less than 5 wt.-%, based on the overall weight of component A) of talc; and/or
component A) comprises less than 4 wt.-%, based on the overall weight of component A) of chalk; and/or
component A) comprises less than 1 wt.-%, based on the overall weight of component A) of paper; and/or
component A) comprises less than 1 wt.-%, based on the overall weight of component A) of wood; and/or
component A) comprises less than 1 wt.-%, based on the overall weight of component A) of metal; and/or
component A) comprises 100 ppm or less of limonene, as determined by solid phase microextraction (HS-SPME-GC-MS); and/or
component A) comprises 200 ppm or less, based on the overall weight of component A) of fatty acids; and/or
component A) is a recycled material, which is recovered from waste plastic material derived from post-consumer and/or post-industrial waste; and/or
the MFR$_2$ (230° C., 2.16 kg) determined according to ISO 1133 of component A) is in the range of 16 to 50 g/10 min; and/or
the Charpy Notched Impact Strength measured according to ISO 179-1eA at 23° C. of component A) is more than 3.0 KJ/m$^2$; and/or
the Tensile Modulus measured according to ISO527-2 of component A) is in the range of 800 to 1500 MPa.

4. The polymer composition according to claim 1, wherein the polymer composition has
a MFR$_2$ (230° C., 2.16 kg) determined according to ISO 1133 in the range of 1 to 50 g/10 min; and/or
a Tensile Modulus measured according to ISO527-2 in the range of 800 to 1800; and/or
a Tensile Strain at Break measured according to ISO527-2 in the range of 100 to 600%; and/or
a Charpy Notched Impact Strength measured according to ISO 179-1eA at 23° C. of more than 2.0 KJ/m$^2$; and/or
a higher Tensile Strain at Break measured according to ISO527-2 than the same polymer composition without component B).

5. The polymer composition according to claim 1, wherein
the content of component A) in the polymer composition is in the range from 20 to 40 wt.-%, based on the overall weight of the polymer composition; and/or
the content of component B) in the polymer composition is in the range from 60 to 80 wt.-%, based on the overall weight of the polymer composition; and/or
the content of polypropylene a1) in component A) is in the range from 75 to 95 wt.-%, based on the overall weight of component A); and/or the content of polyethylene a2) in component A) is in the range from 5 to 25 wt.-%.

6. The polymer composition according to claim 1, wherein the polymer composition comprises at least one additive selected from the group consisting of slip agents, UV-stabiliser, pigments, antioxidants, additive carriers, nucleating agents, and mixtures thereof.

7. The polymer composition according to claim 1, wherein the polymer composition comprises at least the following components A) 20 to 40 wt.-%, based on the overall weight of the polymer composition of a polymer blend, comprising
a1) polypropylene; and
a2) polyethylene;
wherein the weight ratio of a1) to a2) is from 3:7 to 12:1; and wherein the polymer blend A) is a recycled material;

B) 60 to 80 wt.-%, based on the overall weight of the polymer composition of a virgin random polypropylene copolymer; whereby said virgin random polypropylene copolymer has
a xylene soluble content (XCS) based on the overall weight of component B) in the range from 4.0 to 10.00 wt.-%;
a MFR$_2$ (230° C., 2.16 kg) determined according to ISO 1133 in the range of 11 to 20 g/10 min;
a C2-content in the range of 1.5 to 7.0 wt.-% based on the overall weight of component B);
with the proviso that the weight proportions of components A) and B) add up to 100 wt.-%.

8. A process for manufacturing a polymer composition according to claim 1, comprising the following steps:

i) providing a polymer blend A) of a recycled material comprising a1) polypropylene and a2) polyethylene in a weight ratio of a1) to a2) from 3:7 to 12:1 in an amount of 20 to 75 wt.-% based on the overall weight of the polymer composition;

ii) providing a virgin random polypropylene copolymer B) in an amount of 25 to 80 wt.-% based on the overall weight of the polymer composition; wherein said virgin random polypropylene copolymer has
a MFR$_2$ (230° C., 2.16 kg) determined according to ISO 1133 in the range of 11 to 40 g/10 min;

a xylene soluble content (XCS) determined according to ISO 16152, led, 25° C., based on the overall weight of component B) in the range of from 3.0 to 11.99 wt.-%; and
a C2-content in the range of 1.0 to 8.0 wt.-% based on the overall weight of component B);

iii) melting and mixing components A) and B) to obtain the polymer composition; and iv) optionally, cooling down the polymer composition obtained in step iii) and/or pelletizing the polymer composition.

9. The process according to claim 8, wherein component B) has a xylene soluble content (XCS) determined according to ISO 16152, led, 25° C., based on the overall weight of component B) in the range of 4.0 to 10.0 wt.-%; and/or the MFR$_2$ (230° C., 2.16 kg) determined according to ISO 1133 of component B) is in the range of 11 to 20 g/10 min; and/or component B) has a C2-content in the range of 1.5 to 7.0 wt.-%; and/or component B) has a Tensile Modulus measured according to ISO527-2 in the range of 800 to 1800 MPa; and/or component B) has a Tensile Strain at Break measured according to ISO527-2 in the range of 200 to 600%; and/or component B) has a Charpy Notched Impact Strength measured according to ISO 179-1eA at 23° C. in the range of 1.5 to 9.0 KJ/m$^2$.

10. The process according to claim 9, wherein the Tensile Strain at Break measured according to ISO527-2 is determined before adding component B).

11. The process according to claim 8, wherein the chemical composition of component A) and/or the MFR$_2$ (230° C., 2.16 kg) determined according to ISO 1133 is/are determined before adding component B).

12. An article comprising the polymer composition according to claim 1.

13. The article according to claim 12, selected from the group consisting of consumer goods and houseware.

* * * * *